(12) United States Patent
Bauer

(10) Patent No.: US 11,827,756 B2
(45) Date of Patent: Nov. 28, 2023

(54) FREE-FLOWING MIXTURE, ITS USE, AND METHOD FOR ITS PRODUCTION

(71) Applicant: Smart Advanced Systems GmbH, Rudolstadt (DE)

(72) Inventor: Ralf-Uwe Bauer, Rudolstadt (DE)

(73) Assignee: Smart Advanced Systems GmbH, Rudolstadt (DE)

( * ) Notice: Subject to any disclaimer, the term of this patent is extended or adjusted under 35 U.S.C. 154(b) by 0 days.

(21) Appl. No.: 18/157,604

(22) Filed: Jan. 20, 2023

(65) Prior Publication Data

US 2023/0159711 A1 May 25, 2023

Related U.S. Application Data

(63) Continuation of application No. PCT/EP2020/070603, filed on Jul. 21, 2020.

(51) Int. Cl.
 *C08J 3/12* (2006.01)
 *C08L 53/00* (2006.01)

(52) U.S. Cl.
 CPC ............. *C08J 3/124* (2013.01); *C08L 53/005* (2013.01); *C08J 2353/00* (2013.01); *C08J 2453/00* (2013.01); *C08L 2205/02* (2013.01)

(58) Field of Classification Search
 CPC ................................ C09K 5/063; C08J 3/128
 See application file for complete search history.

(56) References Cited

U.S. PATENT DOCUMENTS

| 2006/0124892 A1 | 6/2006 | Rolland et al. |
| 2011/0193008 A1 | 8/2011 | Fieback et al. |
| 2012/0064327 A1 | 3/2012 | Schuetz et al. |
| 2017/0087799 A1 * | 3/2017 | Büttner .................. B32B 27/302 |
| 2019/0237224 A1 | 8/2019 | Heinemann et al. |

FOREIGN PATENT DOCUMENTS

| DE | 10 2010 007 497 A1 | 8/2011 |
| DE | 10 2015 107 860 A1 | 12/2015 |
| DE | 10 2017 113 884 A1 | 12/2017 |
| JP | 2006176761 | * 7/2006 |
| WO | 2009/118344 A1 | 10/2009 |

OTHER PUBLICATIONS

Konishi et al., electronic translation of JP 2006176761, Jul. 2006.*
International preliminary report on patentability and English translation thereof dated Jul. 18, 2022 of international application PCT/EP2020/070603 on which this application is based.
International Search Report dated Apr. 16, 2021 of international application PCT/EP2020/070603 on which this application is based.

* cited by examiner

*Primary Examiner* — Jeffrey C Mullis
(74) *Attorney, Agent, or Firm* — Walter Ottesen, P.A.

(57) ABSTRACT

Disclosed are free-flowing mixtures comprising a granular material comprising a thermoplastic elastomer, a functionalized thermoplastic elastomer, at least one phase change material bound to the thermoplastic elastomers, and at least one binding agent capable of adsorbing and/or absorbing portions of the phase change material. The binding agent is substantially present between the granulate materials, and either: i) the proportion by weight of the phase change material in the granular material is 60% to 90% and the binding agent is a non-silicate binding agent, or ii) the proportion by weight of the phase change material in the granular material is more than 70% and up to 90%. Also described are various compositions comprising the mixture and methods for producing the mixture.

18 Claims, 1 Drawing Sheet

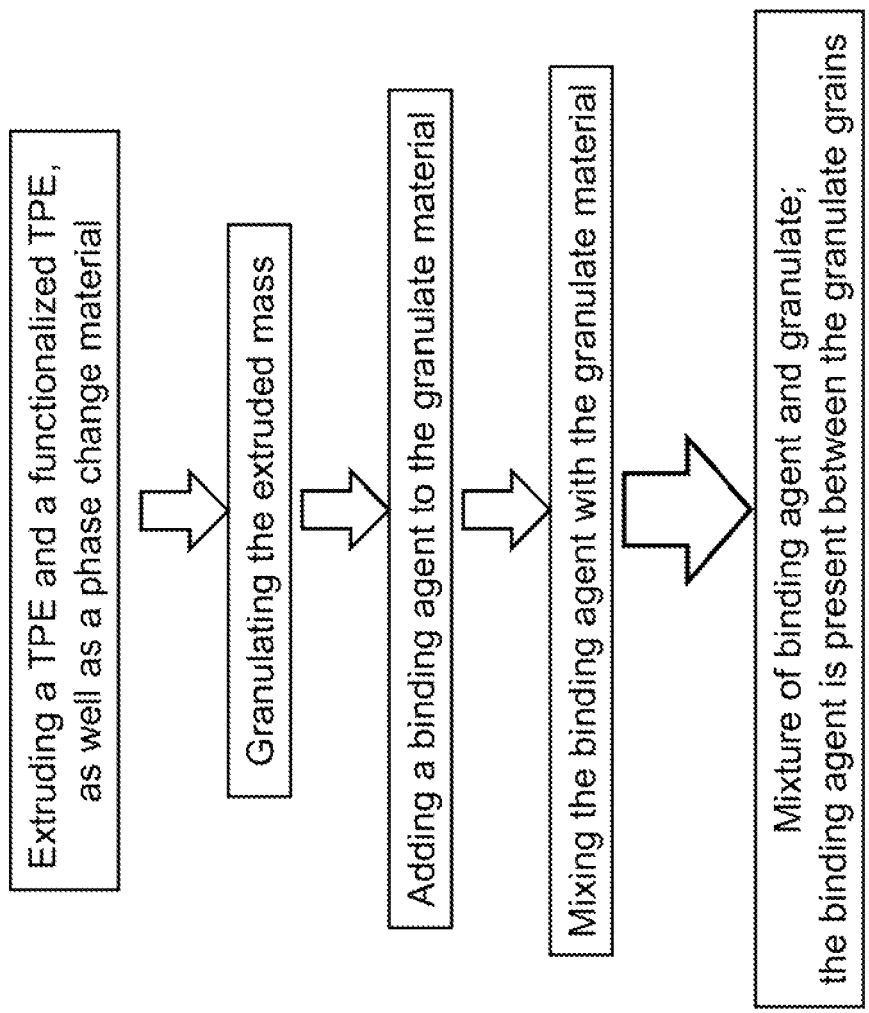

FREE-FLOWING MIXTURE, ITS USE, AND METHOD FOR ITS PRODUCTION

CROSS-REFERENCE TO RELATED APPLICATIONS

This application claims priority of international patent application no. PCT/EP2020/070603, filed Jul. 21, 2020, the entire content of which is incorporated herein by reference.

TECHNICAL FIELD

Disclosed is a free-flowing mixture, uses of the mixture, and a method for producing the mixture.

BACKGROUND

Phase change materials are materials which, during a transition of their aggregate states, particularly between the solid and the liquid state, absorb or release large amounts of energy for an extended period of time. Owing to this property, these phase change materials can serve as latent heat accumulators. Widely known are, for example, plastic pads filled with a phase change material which are transferred into the liquid state by heat supply and remain in the liquid state even after having cooled down. Only by generating a nucleation impulse, for example in the form of an impulse wave, by means of a small metal plate, the crystallization of the PCM will be initiated. During the comparably slow progress of the transition into the solid phase, the pad will release crystallization heat which can be used for an extended period of time, for example, for the targeted warming of body parts.

For avoiding, among other things, an unintended leakage of the phase change materials, for example from a plastic pad as described above, these are frequently embedded in polymers. For counteracting the undesired effect of the so-called "exudation", that is, the leakage of PCM from the polymer matrix upon a thermal and/or mechanical load acting on the preparation, the proportion of the PCM in the preparation is often decreased to, for example, less than 70% in relation to the overall weight of the preparation.

In the following, three references are described.

In the document US 2011/0193008, a method for producing a composition containing a phase change material is described. In a twin screw extruder, paraffins are mixed with a styrene block polymer and polymethylmethacrylate (PMMA) or a linear polyethylene of low density (LLDPE). In addition, carbon nanotubes are mixed into the polymer mixture as an additive. A disadvantage is the necessity of having to use other polymer components in addition to the block polymers.

From the US 2006/0124892 A1, the combination of PCM and various types of copolymers such as VLDPE, EPR, SEBS, or SBS is known. The proportion of the PCM may be 20 to 80%, but preferably amounts to 50 to 70% of the weight of the PCM composition. Moreover, for example, binding agents may be added which are integrated in the polymer matrix.

The production of heat-retaining molded bodies is described in US 2012/0064327. Here, a polymeric carrier component (60 to 25 percent by weight) is extruded together with PCM (40 to 75 percent by weight) as well as the optional addition of additives at 130° C. to 22° C. and quenched.

One problem not satisfactorily solved in these references is the provision of a leak-proof preparation containing at least one polymeric carrier as well as a high percentage of PCM.

Thus, provided is a PCM preparation addressing these concerns, as well as a method for its production.

Provided is a free-flowing mixture comprising a granular material of a thermoplastic elastomer and a functionalized thermoplastic elastomer and including at least one phase change material (PCM) bound to the thermoplastic elastomers. Moreover, the mixture includes at least one binding agent capable of adsorbing and/or absorbing portions of the phase change material. The thermoplastic elastomer and the functionalized thermoplastic elastomer is referred to as TPE or as functionalized TPE, below.

The disclosed mixtures comprise a binding agent that is substantially present between the granulate materials. The binding agent is therefore not integrated and incorporated in the thermoplastic elastomers functioning as polymeric carriers but is present in the spaces between the granules of the granulate material. Apart from binding agent freely present in the spaces, in some embodiments, part of the binding agent also adheres to the surface of the granulate grains due to emerging adhesive forces. However, the binding agent is neither covalently bound to the granulate grains nor incorporated in these.

In mixtures described herein, the proportion by weight of the phase change material in the granular material is either (first alternative) i) 60% to 90% if the binding agent is a non-silicate binding agent, or (second alternative) ii) the proportion by weight of the phase change material in the granular material is more than 70%, particularly more than 80% and up to 90%.

The inventors have discovered that both a high percentage of a PCM and leakage safety of the mixture as well as the preservation of the pourability of the mixture can be achieved at the same time if the binding agent is substantially present in the spaces of the granulate material and PCM potentially leaked from the polymeric carrier ("exuded" PCM) is bound there. Here, the heat storage capacity of the PCM is not or not substantially affected.

In some embodiments, functionalized thermoplastic elastomers are described comprising additional functional groups, the effect of which is that the properties of the functionalized TPE can be adjusted in a targeted manner. In one embodiment, the functionalized thermoplastic elastomer is a thermoplastic elastomer provided with additional hydroxy groups (—OH). Such a functionalization advantageously increases the basic binding capacity of the polymeric carrier with respect to the PCM.

The thermoplastic elastomer is, in some embodiments, a styrene block polymer, and the functionalized thermoplastic elastomer is, in other embodiments, a functionalized styrene block polymer.

As phase change materials, known substances may be used. For example, aliphatic hydrocarbon compounds such as saturated or unsaturated C10-C40-hydrocarbons present in a branched or linear form may be used. Likewise, cyclic hydrocarbons or aromatic hydrocarbons as well as fatty alcohols or C6-C30-fatty amines may be used. Also possible is the use of the C1-C10-alkyl esters of fatty acids. Natural or synthetically produced waxes or halogenated hydrocarbons are likewise conceivable phase change materials. The melting temperature of the PCM should be −5° to 100° C., and preferably be in a range of 5° C. to 85° C.

Within the meaning of the present description, binding agents are substances enabling a targeted absorption of hydrophobic phase change materials by sorption or capillarity. Sorption refers to the selective absorption capacity for defined substance classes, in this specific case for phase change materials.

Without wishing to be bound by any specific theory, the at least one binding agent in some respects is thought to act as an absorber or adsorber for the portions of the phase change material not firmly embedded in the network structure of the polymer-bound PCM granulate material in every case. Here, the binding agent is advantageously present in a finely grained, pulverized and/or fibrous, particularly short-fibered state to obtain a high specific surface and thus binding capacity with respect to the PCM and to, at the same time, preserve pourability.

The determination of the pourability may be performed, for example, with the aid of measurement funnels or special pourability test devices and implemented according to DIN EN ISO 6186. In the process, the trickling time required for a predetermined mass or a predetermined volume of granular material to be tested is measured.

In some embodiments, the amount of the binding agent is up to 100% with respect to the polymer-bound amount of PCM. The required minimum amount of binding agent maybe determined by testing the binding agent as to whether it is present in a pasty or pasted form after the phase change test has been performed. For example, the standard RAL-GZ 896 of the Deutsches Institut für Gütesicherung and Kennzeichnung e.V. (Gütesicherung Quality Assurance RAL-GZ 896; as of March 2018) may serve as a testing standard for the cycle stability.

As a testing method for the absorption capacity for phase change materials in a specific binding agent, the so-called Westinghouse method may be applied. In this method, heating the sample area beyond the phase change temperature of the test substance is required. For the measurements of the absorption capacity for phase change materials, conical sieves having a defined mesh size are immersed in the phase change material to be examined after pre-cleaning with, for example, 2-propanol, and weighted with a scale having an accuracy of 0.1 g (wetted sieve) after at least 10 minutes of draining time. Then, the sieve is immersed in the phase change material, and 20 g of the binding agent to be examined are applied to the surface of the liquid. The sieve is immersed in the phase change material and remains in the liquid for 20 minutes. Then, the sieve is carefully lifted out and may drip dry for at least 30 minutes. Thereafter, the sieve with the binding agent saturated with phase change material is weighted by means of a scale. The mass of bound phase change material is then calculated based on the measurement value of the scale minus the mass of the binding agent (20 g) and minus the mass of the wetted sieve. When the masses of the absorbed PCM are set in relation to the mass of the used binding agent and multiplied by one hundred ((mass of the PCM/mass of the binding agent)×100) the absorption capacity in percent by weight is obtained. This measuring method identifies the maximum absorption quantity of the binding agents for the respective phase change materials.

According to an embodiment, in a disclosed mixture, the binding agent is a non-silicate binding agent selected from, for example, polymeric powders and/or polymeric fibers that, in certain embodiments, include polyurethane, polyacrylates, cross-linked polyalkene-terpolymers, polypropylene, thermoplastic elastomers, and rubber, as well as mixtures thereof.

Powders and/or short fibers of polysaccharides as well as derivates thereof and lignocellulose have proven particularly suitable as non-silicate binding agents. The used polysaccharides may be produced from, for example, natural cellulose, regenerated cellulose, or also from cotton. Lignocellulose powder or fibers are, in some embodiments, obtained from, for example, fir, beech, Swiss pine, or pine wood. The use of waste materials from food production such as, for example, ground maize cobs is also possible. Likewise suitable are ground kernels, for example olive stones. Powders produced from plant bark, bark or cork are also well suited. Various herbs or grasses in fiber or powder form may also be used. Particularly for applications in the home textiles sector, the release of aetheric constituents from the binding materials may be advantageous here. In a further embodiment, algae powders are potential binding agents. Ground plant parts can also be used as binding agents. Furthermore, it is possible to use non-silicate hydrophobic biogenic sediments as binding agents according to the first alternative i). The utilization of natural materials (upcycling) is also advantageous here.

According to another embodiment, a silicate binding agent from a group comprising silicates, particularly calcium silicate, magnesium silicate, magnesium aluminum silicate, or hydrate forms thereof; as well as layer silicates (phyllosilicates), particularly palygorskite, and vermiculite is selected. In addition, hydrophobic silicate biogenic sediments, particularly diatomite (for example, diatomaceous earth) as well as mixtures containing diatomite and salt of acrylic acid are used as silicate binding agents, in some embodiments.

In further embodiments, the properties of the binding agents are specifically influenced by functionalising them. Binding agents in the described mixtures are in some embodiments functionalized by, for example, at least one of the groups alkyl, vinyl, epoxy, amino, methacryl, mercapto, and tetrasulphone silanes.

The pourability of the described mixtures opens up numerous application options. If the mixture is to be used in, for example, flexible and soft products, or if even small cavities are to be filled it is advantageous when the granular material has grain sizes of 0.5 mm to 3 mm, preferably of 0.6 mm to 1.5 mm. The particle size or the fiber length of the binding agent is preferably adapted to the grain size of the granulate material so that it is accommodated in the spaces of the poured granulate material.

The average diameter of the grains is able to be determined by, for example, the use of sieves in a suitable graduation.

The mixtures described herein are in some embodiments used in the form of a flow due to its pourability. For example, the mixture is directly usable as a fill for the construction of heat storage systems in building applications. Depending on the use of functionalized binding agents, the combination with a plurality of construction materials available in the market is possible.

A further use is a container comprising one or more chambers containing the described mixtures. The mixtures are, in some embodiments, introduced into hollow chambers of the container. As an example, the use of the mixture for the crop acceleration of plants as a fill or filling in double-walled plant pots may be mentioned here. However, the mixture described herein is also suitable for the application of the pourable mixture as a heat or low-temperature stabilizer in the form of containers filled with the mixture and having one or more chambers in the field of gastronomy, in catering, or in household applications. Associated containers having one or more chambers may be made of, for example, polymers, glass, ceramic and/or metal.

In other embodiments, a mixture as described herein is introduced into films, non-woven fabrics, leather, textiles (for example webs, crocheted fabrics, or knitted fabrics), or other suitable surface structures. In case of films, non-woven fabrics, or textiles, the mixtures may be disposed between two or more layers of the used materials. These layers may then be connected to each other depending on the demanded application. The connection may be established by, for example, fusing, bonding, sewing, or other suitable joining methods.

A plurality of applications requires the formation of chamber profiles, for example by fusing or bonding the materials. A subdivision into chambers will ensure a desired distribution of the mixture within the materials or inside the product produced therefrom. Moreover, the flexibility and/or the amount of thermal energy to be absorbed and released can be tailored depending on the desired applications with the aid of the shape, size, and the filling level of the individual chambers. For example, geometric structures subdivided into chambers offer suitable configuration options. Materials such as, for example, films, non-woven fabrics, leather, foamed products, or other materials, as well as combinations thereof which, in their implemented chambers, contain the mixture may be used as cooling or heating inlays for the home textiles sector and in clothing. For example, cooling pads are a potential application.

For the production of flexible structures for the application close to the body, advantageously, soft, elastic films, non-woven fabrics, or textiles are used in the configuration of chamber profiles. Particularly suitable films are, for example, films made of polyurethane. In an embodiment, there is a formation of a mixture of air and the mixture so that, in this way, the heat transition and the flexibility of the combination can, in addition, be influenced and adapted.

However, the mixtures described herein are, in some embodiments, introduced into a film composite almost free of air through application of a vacuum or of the use of shrink films after the introduction into films.

Moreover, in some embodiments, the described mixtures contain liquid silicone. Such mixtures, in some embodiments, include a functionalized binding agent so that they are directly integrated in liquid silicones. To this end, the liquid silicones are produced by admixing the hardening component and by subsequently mixing it with the mixture in the desired ratio. Percentages of the mixture in the liquid silicone of up to 80% of the proportion by volume of the overall proportion may be realized. Silicone compounds produced in this way are usable as flexible films in the wide temperature range.

In a further embodiment, the described mixtures are combined with polyacrylates or polyurethanes. A possible embodiment is obtained by adapting aqueous dispersions of polyurethanes or polyacrylates in their viscosity by adding thickening agents and mixing them with the mixture. The mixture of polyacrylate or polyurethane obtained in this way and the mixture is, in some embodiments, directly processed into films or three-dimensional molded bodies. Another embodiment is based on the principle of the formation of polyurethane gels and the integration of the mixture in the produced gels.

It is also possible to successfully embed the PCM mixtures into cellulose films. To this end, for example, aqueous solutions of cellulose derivates are produced. These solutions are provided with one or more carbonyl and/or carboxyl functions by polyol spacers and crosslinking agents. The cellulose derivate solution modified in this way is combined with the mixture according to the invention. After drying the compound produced in this way, flexible or rigid films will emerge depending on the production conditions. The resulting films are swellable and can absorb high proportions of water depending on degree of cross-linking. Owing to the water absorption, an additional water evaporation is possible particularly for cooling applications in the area close to the body. In this way, significant increases in the aggregate cooling performance are achieved.

The described combinations of the mixture described herein with polyacrylates, polyurethanes, silicones or cellulose derivates are, in some embodiments, produced into geometrically defined structures on flexible or rigid basic support materials. For example, the defined structures may be spherical, square, rectangular or polygonal molded bodies. The liquid, highly viscous combination of the mixtures described herein and the polyacrylates, polyurethanes, silicones or cellulose derivate solutions are applied to carrier structures by, for example, pouring, brushing or spraying. Here, foams, films, webs, crocheted fabrics, knitted fabrics, or non-woven fabrics may be deployed as carrier materials. In this way, textile carriers comprising a coating of the mixture and/or textile carriers containing the described mixtures are produced.

In another embodiment, the mixtures described herein are introduced into molded bodies, for example into foams or foamed molded bodies.

Also provided are methods for producing the free-flowing mixtures. The methods include the steps of, for example, extruding a thermoplastic elastomer, a functionalized thermoplastic elastomer, and at least one phase change material into a homogenous mass, the percentage of the phase change material being 60% to 90% of the extruded mass, as well as of granulating the extruded mass. Then, a binding agent is added to the produced granular material. The binding agent and the granular material are mixed, the binding agent being substantially present between the granules of the granulate material.

For example, the production of the granulate materials is performed using an extruder exhibiting a high productivity in the mass throughput per time unit. A phase change material is mixed with a thermoplastic elastomer (TPE), for example a styrene block polymer, and a functionalized TPE, for example on the basis of styrene block polymers, under shear. After thoroughly mixing the polymers with the PCM, polymer-bound granulate PCM materials are produced in a water bath optionally including an under-water granulating system. After cooling and drying the granulate materials, additional binding agents are added, and a mixture of granular PCM material and binding agents is produced. The binding agents are capable binding surplus phase change material as described above.

If the PCM has a melting temperature above room temperature, then an additional heating of the mixture accompanied by intense mixing may be required. In contrast, if the melting point of the PCM is below room temperature, a systematic cooling and mixing of the PCM mixture may be performed. This mixture produced in this way is, in some embodiments, processed directly or in combination with other polymeric materials. Advantageously, the proportion of the phase change materials in the polymer-bound PCM granulate materials is 60% to 90%. The amount of the binding agent to be added is determined depending on the amount of the percentage of the PCM. An amount of binding agent or binding agent mixtures preserving the pourability of the mixture is to be used. The binding agents should be finely grained and/or pulverized and/or fibrous, and in some embodiments, the binding agent should be disposed in the free volume between the granulate grains and on the surface of the particles. Particularly for flexible soft structures in the final application, the granulate grains should be as small as possible. In some embodiments, the grains have an average diameter of 0.5 mm to 3 mm, or 0.6 mm to 1.5 mm.

In further embodiments of the described methods, the proportion of the phase change material is more than 70%, or more than 80% to 90%, of the extruded mass if a silicate binding agent is used.

The advantages of the described mixtures reside in the provision of a flexible latent heat storage system having a high heat storage capacity per unit of volume. In addition, it is cost-effective in its production and leak-proof in application. In handling, the mixtures described herein are mechanically stable and can be readily introduced into various geometries and combinations. A direct further processing of the mixture consisting of the granulate materials and the additional binding materials for PCM materials is possible.

BRIEF DESCRIPTION OF DRAWINGS

The invention will now be described with reference to the single FIG. of the drawing (FIG. 1) which shows the method described herein.

DETAILED DESCRIPTION

In an embodiment, the method described herein is schematically summarized in FIG. 1. In a first step, a TPE and a functionalized TPE as well as a PCM are extruded together so that these components are homogenously mixed and the PCM is integrated in the polymer matrix formed by the TPEs. The mass obtained by the extrusion process is granulated. After its cooling and drying, particularly a binding agent of the type described above is added to the produced granular material and mixed with the granular material. Here, the binding agent is not incorporated in the granular material. As a result, a mixture of the granular material and the binding agent in which the binding agent is present between the granules of the granulate material is obtained.

Example 1

Production of a Mixture

Using a twin screw extruder of the type ZSE 40 (company: Leistritz) having a ratio of screw length to screw diameter of 52:1, the TPE of the type SEEPS (Septon 4055 having a styrene proportion of 30%) in a proportion of 15% and the functionalized TPE of the type SEEPS-OH (Septon HG 252 having a styrene proportion of 28%) in a proportion of 5% are melted on in the first zones in the first step. The molten paraffin derivate of Sasol Parafol 16-97 is mixed with the molten material as a PCM in a percentage by mass of 80% via a metering device. The average retention time is 4 minutes, and the throughput is 25 kg/h. The molten PCM compound is processed into granulate grains via an underwater granulator and dried. After drying, the granular material is provided with biogenic diatomaceous earth in a percentage by mass of 30% with respect to the produced granulate mass. The material can be directly used as a fill.

Example 2

Production of a Mixture Including Cellulose Powder

The production of the PCM compounds is performed as in Example 1. After drying the granulate materials, a ground cellulose available under the trade name Jelucel HM 300 is admixed in a percentage by mass of 15%. The mixture produced in this way is introduced into non-woven fabrics as a filling material and serves the production of cooling textiles.

Example 3

A Mixture Including Functionalized Binding Materials

Using a twin screw extruder of the type ZSE 40 (company: Leistritz) having a ratio of screw length to screw diameter of 52:1, the TPE of the type SEEPS (Septon 4055 having a styrene proportion in a percentage by mass of 30%) in a percentage by mass of 19% and the functionalized TPE of the type SEEPS-OH (Septon HG 252 having a styrene proportion of 28%) in a percentage by mass of 5% are melted on in the first zones in the first step. The molten paraffin derivate of Sasol Parafol 20Z in a percentage by mass of 76% is mixed with the molten material as a PCM via a metering device. The average retention time is 3 minutes, and the throughput is 30 kg/h. The molten PCM compound is processed into granulate grains via an under-water granulator and dried. After drying, the granular material was provided with a functionalized mineral substance from the company Hoffmann Mineral Aktisil Q in a proportion of 20% with respect to the generated granulate mass. The mixture obtained in this way is mixed with liquid silicone and a cross-linking agent and forms flexible silicone films containing PCM after hardening.

Example 4

Application of the Mixture into Chamber Structures of Films, Non-Woven Fabrics, and Fabrics In a polyurethane film having a thickness of 100 μm by Gerlinger Industries, hollow chambers having a diameter of 3 cm in the dimensions of 30 cm×60 cm are produced in the fusing method and filled with 125 g of a mixture according to the invention per chamber. After fusing the filling side of the hollow chamber film, in the chambers, an amount of air and the mixture according to the invention is obtained. The film structure produced in this way has an aggregate heat storage capacity of 568 Wh/m$^2$ in the temperature range of 5-20° C. In the production of samples of the embodiment, surfaces provided with an adhesive layer on one side were fused or partly bonded using non-woven fabrics or fabrics. Chambers in desired geometrical shapes are produced. In case of the use of ultrasonic fusing, an additional adhesive layer can be omitted.

Example 5

Incorporation of the Mixture into Knob Structures

A mixture according to Example 1 is combined with an aqueous dispersion of polyacrylates. An OH-functionalized acrylate dispersion (Joncryl MBFlex) having a solid mass proportion of 42% and a viscosity of 1000 mPas (25° C.) is used. 72.2 g MBFlex are mixed with 3.6 g of thickening agent of the type Tafigel Pur 61. Subsequently, 130 g of the mixture according to the invention are added. The mixture obtained in this way is cast into a metal mold. The metal mold contained a non-woven fabric in the lowest layer and is covered by a blank mold having more than 6400 square subareas per m$^2$. The highly viscous mixture of polyacrylate dispersion, thickening agent, and the mixture form a knob structure after the removal of the water content.

It is understood that the foregoing description is that of the preferred embodiments of the invention and that various changes and modifications may be made thereto without departing from the spirit and scope of the invention as defined in the appended claims.

The invention claimed is:

1. A free-flowing mixture comprising:
   a granulate material comprising a thermoplastic elastomer, a functionalized thermoplastic elastomer, and at least one phase change material, wherein the at least one phase change material is bound to the thermoplastic elastomer,
   at least one binding agent, wherein the at least one binding agent at least one of: adsorbs and absorbs portions of the phase change material,
   wherein the at least one binding agent is present in intermediate spaces between grains of the granulate material; and
   i) the proportion by weight of the at least one phase change material in the granulate material is 60% to 90%, and the at least one binding agent is a non-silicate binding agent; or
   ii) the proportion by weight of the at least one phase change material in the granulate material is more than 70% to 90%.

2. The mixture according to claim 1, wherein the thermoplastic elastomer is a styrene block polymer, and wherein the functionalized thermoplastic elastomer is a functionalized styrene block polymer.

3. The mixture according to claim 1, wherein the functionalized thermoplastic elastomer is a thermoplastic elastomer comprising hydroxy groups.

4. The mixture according to claim 1, wherein the non-silicate binding agent is one or more of: polymeric powders and/or polymeric fibers, polysaccharides, lignocellulose, natural fibers, herbs, grasses, algae, hydrophobic biogenic sediments, and a powder of ground plant parts.

5. The mixture according to claim 1, wherein the at least one binding agent is a silicate binding agent selected from one or more of: silicates, and hydrophobic silicate biogenic sediments.

6. The mixture according to claim 1, wherein the binding agent is functionalized by at least alkyl, vinyl, epoxy, amino, methacryl, mercapto, or tetrasulphone silanes.

7. The mixture according to claim 1, wherein the granulate material has grain sizes of 0.5 mm to 3 mm.

8. A filling comprising the mixture according to claim 1.

9. A textile carrier comprising a coating which comprises the mixture according to claim 1.

10. A container comprising one or more chambers, wherein the one or more chambers comprises the mixture according to claim 1.

11. A liquid silicone comprising the mixture according to claim 6.

12. A film comprising the mixture according to claim 1.

13. A molded body comprising the mixture according to claim 1.

14. A method for producing a free-flowing mixture, which comprises:
   extruding a thermoplastic elastomer, a functionalized thermoplastic elastomer, and at least a phase change material into a homogenous mass, thereby producing an extruded mass, wherein the proportion of the phase change material is 60% to 90% of the extruded mass,
   granulating the extruded mass to produce a granulate material;
   adding a binding agent capable of at least one of adsorption and absorption of portions of the phase change material and mixing the binding agent with the granulate material, the binding agent being present between the grains of the granulate materials.

15. The mixture according to claim 4, wherein the polymeric powders and/or polymeric fibers comprises one or more of polyurethane, polyacrylates, cross-linked polyalkene-terpolymers, polypropylene, thermoplastic elastomers, and rubber.

16. The mixture according to claim 5, wherein the silicate is calcium silicate, magnesium silicate, magnesium aluminum silicate, or hydrate forms thereof.

17. The mixture according to claim 5, wherein the hydrophobic silicate biogenic sediment is diatomite, mixtures containing diatomite, or salt of acrylic acid.

18. The mixture according to claim 1, wherein the granulate material has grain sizes of 0.6 mm to 1.5 mm.

* * * * *